United States Patent
Kim et al.

(10) Patent No.: US 8,064,002 B2
(45) Date of Patent: Nov. 22, 2011

(54) LIQUID CRYSTAL DISPLAY DEVICE HAVING PATH OF DISCHARGING UNDESIRED CHARGES AND METHOD OF FABRICATING THE SAME

(75) Inventors: Chang-Soo Kim, Gyeonggi-do (KR); Byung-Gun Ahn, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 344 days.

(21) Appl. No.: 12/318,045

(22) Filed: Dec. 19, 2008

(65) Prior Publication Data
US 2009/0310055 A1    Dec. 17, 2009

(30) Foreign Application Priority Data
Jun. 16, 2008  (KR) .................. 10-2008-0056293

(51) Int. Cl.
  *G02F 1/1333*    (2006.01)
(52) U.S. Cl. ................ 349/40; 349/58; 349/59
(58) Field of Classification Search ............ 349/40, 349/58–59
See application file for complete search history.

(56) References Cited

U.S. PATENT DOCUMENTS

| 6,525,786 B1 * | 2/2003 | Ono ........................ 349/40 |
| 2007/0224415 A1 * | 9/2007 | Satake et al. ............ 428/341 |
| 2008/0014373 A1 | 1/2008 | Muramatsu et al. |

FOREIGN PATENT DOCUMENTS

| CN | 1376544 A | 10/2002 |
| CN | 1993633 A | 7/2007 |
| KR | 10-2003-0095746 | 12/2003 |

* cited by examiner

*Primary Examiner* — Nathanael R Briggs
(74) *Attorney, Agent, or Firm* — Morgan, Lewis & Bockius LLP (57) ABSTRACT

A liquid crystal display device includes: first and second substrates facing and spaced apart from each other; a liquid crystal layer between the first and second substrates; a first polarizing plate on an outer surface of the first substrate; a second polarizing plate on an outer surface of the second substrate, the second polarizing plate including an anti-static pressure sensitive adhesive (ASPSA) layer; and a conductive tape electrically connected to the ASPSA layer.

14 Claims, 5 Drawing Sheets

LIQUID CRYSTAL DISPLAY DEVICE HAVING PATH OF DISCHARGING UNDESIRED CHARGES AND METHOD OF FABRICATING THE SAME

This application claims the benefit of Korean Patent Application No. 10-2008-0056293 filed on Jun. 16, 2008, which is hereby incorporated by reference in its entirety.

TECHNICAL FIELD

The present application relates to a liquid crystal display device, and more particularly, to a liquid crystal display device that is protected from a static electricity and a method of fabricating the liquid crystal display device.

BACKGROUND

Liquid crystal display (LCD) devices, which have been widely used for a television and a monitor because of advantages in displaying moving images and high contrast ratio, use the optical anisotropy and polarization properties of liquid crystal molecules of a liquid crystal layer to produce an image. Accordingly, an LCD device includes a liquid crystal panel having two substrates spaced apart and facing each other and a liquid crystal layer interposed between the two substrates and a backlight unit supplying light to the liquid crystal panel. An alignment direction of the liquid crystal molecules in the liquid crystal layer is controlled by an electric field generated between the two substrates and transmittance of the liquid crystal layer is changed according to the alignment direction.

Although twisted nematic (TN) mode LCD devices using a vertical electric field have advantages in resolution and ability of displaying moving images, the TN mode LCD devices using the vertical electric field have disadvantages in a viewing angle. Accordingly, in-plane switching (IPS) mode LCD devices using a horizontal electric field have been the subject of recent research.

Figure 1:
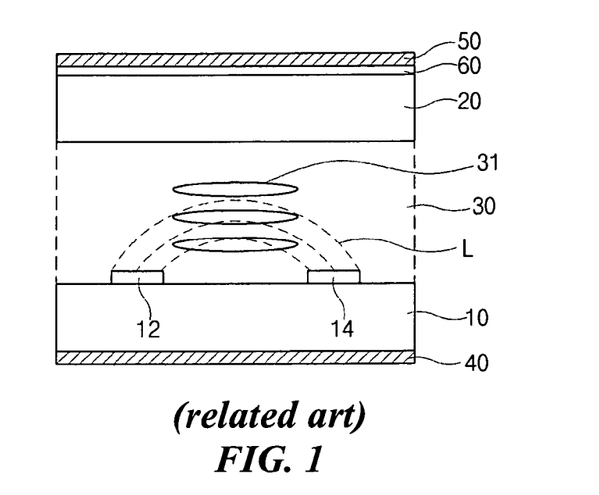
FIG. 1 is a cross-sectional view showing a liquid crystal panel of an IPS mode LCD device according to the related art.

FIG. 1 is a cross-sectional view showing a liquid crystal panel of an IPS mode LCD device according to the related art. In FIG. 1, the liquid crystal panel of the IPS mode LCD device includes first and second substrate 10 and 20 facing and spaced apart from each other and a liquid crystal layer 30 between the first and second substrates 10 and 20. First and second polarizing plates 40 and 50 are formed on outer surfaces of the first and second substrates 10 and 20, respectively. A transmission axis of the first polarizing plate 40 is orthogonal to a transmission axis of the second polarizing plate 50. A common electrode 12 and a pixel electrode 14 are formed on an inner surface of the first substrate 10. A horizontal electric field L is generated between the common electrode 12 and the pixel electrode 14, and liquid crystal molecules 31 in the liquid crystal layer 30 are aligned along the horizontal electric field L to be perpendicular to the common electrode 12 and the pixel electrode 14.

In the liquid crystal panel of the IPS mode LCD device, the common electrode 12 and the pixel electrode 14 are formed on the same substrate, i.e., the first substrate 10, and the horizontal electric field L is generated between the common electrode 12 and the pixel electrode 14. Since the liquid crystal molecules 31 are arranged along the horizontal electric field L parallel to the first and second substrates 10 and 20, the IPS mode LCD device has a relatively wide viewing angle.

When undesired charges causing static electricity are injected into the liquid crystal panel of the IPS mode LCD device, the horizontal electric field L and the alignment direction of the liquid crystal molecules 31 may be distorted. As a result, the liquid crystal panel of the IPS mode LCD device may be abnormally operated. Since the second substrate 20 of the liquid crystal panel of the IPS mode LCD device does not have a common electrode on the entire inner surface thereof, a transparent conductive metal layer 60 is formed between the outer surface of the second substrate 20 and the second polarizing plate 50 to prevent the static electricity. The transparent conductive metal layer 60 may be grounded by connection to a supporting means for the liquid crystal panel through a conductive tape (not shown). However, the production cost of the IPS mode LCD device increases due to a high material cost for the transparent conductive metal layer 60 and the fabrication process of the IPS mode LCD device is complicated due to the additional steps for the transparent conductive metal layer 60.

SUMMARY

A liquid crystal display device includes: first and second substrates facing and spaced apart from each other; a liquid crystal layer between the first and second substrates; a first polarizing plate on an outer surface of the first substrate; a second polarizing plate on an outer surface of the second substrate, the second polarizing plate including an anti-static pressure sensitive adhesive (ASPSA) layer; and a conductive tape electrically connected to the ASPSA layer.

In another aspect, a method of fabricating a liquid crystal display device includes; forming first and second polarizing plates on first and second substrates, respectively, the second polarizing plate including an anti-static pressure sensitive adhesive (ASPSA) layer; attaching first and second substrates such that the first and second polarizing plates are outwardly disposed; forming a liquid crystal layer between the first and second substrates; and electrically connecting a conductive tape to the ASPSA layer.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE EMBODIMENTS

Reference will now be made in detail to embodiments which are illustrated in the accompanying drawings. Wherever possible, similar reference numbers will be used to refer to the same or similar parts.

Figure 2:
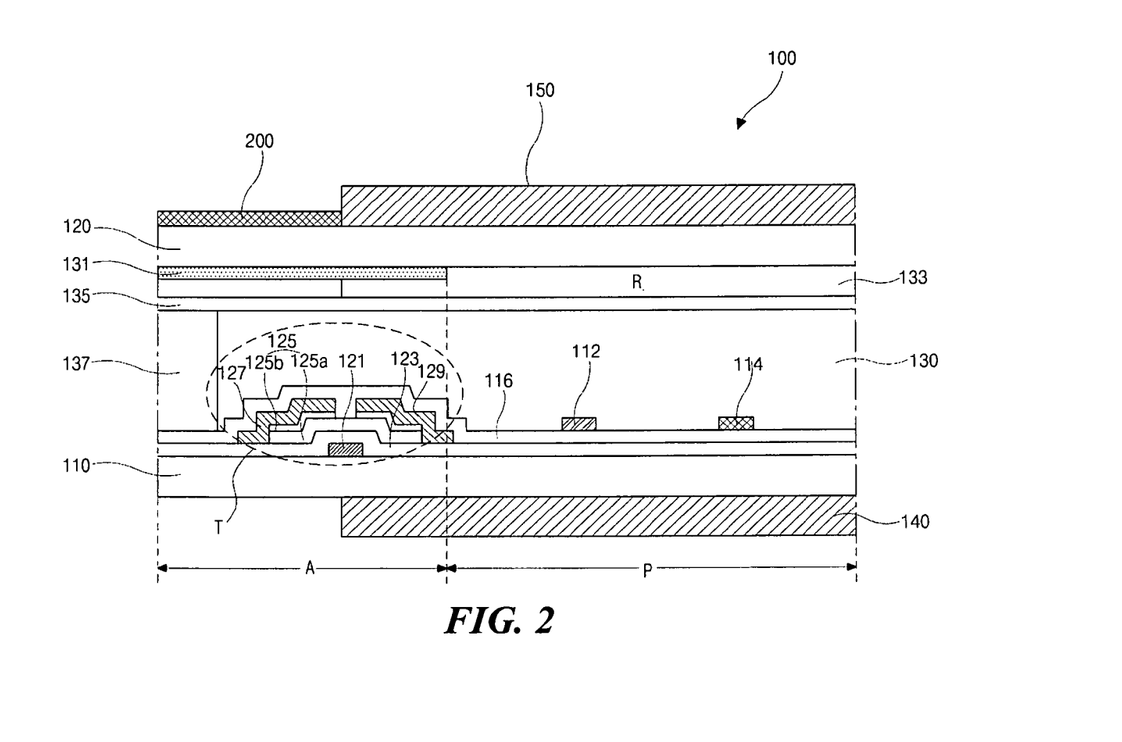
FIG. 2 is a cross-sectional view showing a liquid crystal panel of a liquid crystal display (LCD) device according to an embodiment of the invention.

FIG. 2 is a cross-sectional view showing a liquid crystal panel of a liquid crystal display (LCD) device according to an embodiment of the invention.

In FIG. 2, a liquid crystal panel 100 includes first and second substrates 110 and 120 facing and spaced apart from each other and a liquid crystal layer 130 between the first and second substrates 110 and 120. The first substrate 110 may be referred to as a lower substrate or an array substrate, and the second substrate 120 may be referred to as an upper substrate or a color filter substrate. The first substrate 110 includes a display region P displaying images and a non-display region A surrounding the display region P. The non-display region A may be used as a connection area for the display region P and an external driving circuit. A thin film transistor (TFT) T including a gate electrode 121, a semiconductor layer 125, a source electrode 127 and a drain electrode 129 is formed on an inner surface of the first substrate 110 in the non-display region A. A passivation layer 116 is formed on the TFT T. In addition, a pixel electrode 114 and a common electrode 112 are formed on the passivation layer 116 in the display region P. The pixel electrode 114 is connected to the drain electrode 129 and is spaced apart from the common electrode 112 to generate a horizontal electric field.

The pixel electrode 114 and the common electrode 112 are formed of a transparent conductive material such as indium-tin-oxide (ITO) and indium-zinc-oxide (IZO). Although not shown in FIG. 2, a pixel region defined by gate and data lines may include a plurality of pixel electrodes 114 and a plurality of common electrodes 112 alternately disposed with each other. Further, although the pixel electrode 114 and the common electrode 112 have the same layer as each other in FIG. 2, the pixel electrode 114 and the common electrode 112 may have different layers from each other in another embodiment. For example, the pixel electrode 114 may have the same layer as the source and drain electrodes 127 and 129, and the common electrode 112 may have the same layer as the gate line.

A black matrix 131 having an open portion is formed on an inner surface of the second substrate 120 in the non-display region A, and a color filter layer 133 is formed on the black matrix 131 and the second substrate 120 corresponding to the open portion of the black matrix 131. The black matrix 131 covers the TFT T to prevent a light leakage current of the TFT T and the color filter layer 133 includes red, green and blue color filters. In addition, an overcoat layer 135 is formed on the color filter layer 133 to protect the color filter layer 133 and function as a planarization layer.

The liquid crystal layer 130 includes liquid crystal molecules (not shown) aligned to be parallel to the first and second substrates 110 and 120. A seal pattern 137 is formed along a boundary of the non-display region A between the first and second substrates 110 and 120 to prevent leakage of the liquid crystal molecules. First and second polarizing plates 140 and 150 transmitting polarized light having a predetermined optic axis are formed on outer surfaces of the first and second substrates 110 and 120, respectively. A backlight unit (not shown) as a light source is disposed under the liquid crystal panel 100 to supply light. The liquid crystal panel 100 and the backlight unit are coupled by a supporting means to constitute an LCD device.

When a gate signal is applied to the gate electrode 121 of the TFT T, the TFT T is turned on to transmit a data signal to the pixel electrode 114. As a result, a horizontal electric field is generated between the pixel electrode 114 and the common electrode 112 due to the voltage difference thereof, and the liquid crystal molecules are re-aligned along a direction of the horizontal electric field. The light transmittance through the first polarizing plate 140, the liquid crystal layer 130 and the second polarizing plate 150 is determined according to the alignment of the liquid crystal molecules and a color image is displayed through the color filter layer 133. In the liquid crystal panel 100, undesired charges causing the static electricity are eliminated through the first and second polarizing plates 140 and 150.

Figure 3:
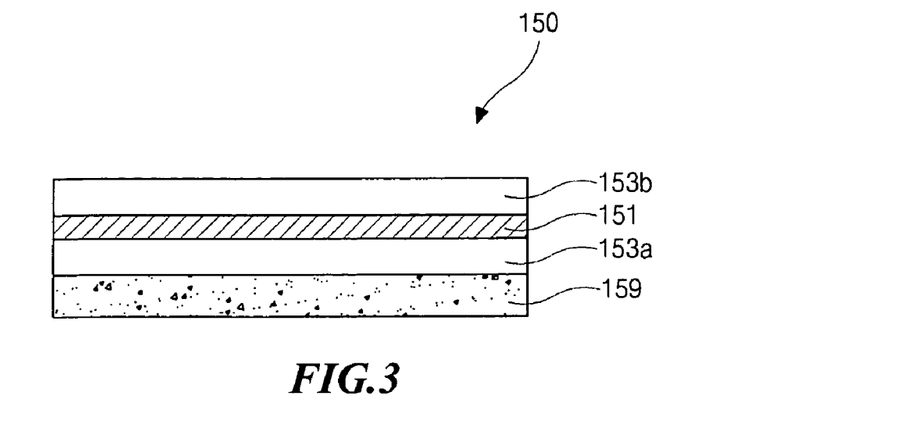
FIG. 3 is a cross-sectional view showing a polarizing plate of an LCD device according to an embodiment of the invention.

FIG. 3 is a cross-sectional view showing a polarizing plate of an LCD device according to an embodiment of the invention.

In FIG. 3, a second polarizing plate 150 includes a polarizing layer 151, first and second tri-acetate cellulose (TAC) films 153a and 153b and an anti-static pressure sensitive adhesive (ASPSA) layer 159. The polarizing layer 151 polarizes an incident light. The first and second TAC films 153a and 153b are formed on first and second surfaces of the polarizing layer 151, respectively, to support and protect the polarizing layer 151. The second polarizing plate 150 is attached to an outer surface of a second substrate 120 (of FIG. 2) by the ASPSA layer 159.

In another embodiment, an anti-glare layer including a silica bead may be formed on the second TAC film 153b to prevent a mirror reflection, and the first TAC film 153a may include a discotic liquid crystal layer where discotic liquid crystal molecules are arranged in a hybrid type to improve a viewing angle property. In addition, a hard coating layer may be formed on the second TAC film 153b to protect the surface of the second TAC film 153b, and a sticking preventing layer may be formed on the second TAC film 153b to prevent contact of the second TAC film 153b and an adjacent layer. Moreover, an auxiliary protecting layer may be formed under the ASPSA layer 159. The auxiliary protecting layer protects the ASPSA layer 159 from contamination during transfer of the second polarizing plate 150 and is removed right before the second polarizing plate 150 is attached to the second substrate 120.

The ASPSA layer 159 may include a metallic epoxy such as a silver (Ag) epoxy to have an excellent adhesive property and a relatively high conductivity. Accordingly, the second polarizing plate 150 is attached directly to the outer surface of the second substrate 120 of the liquid crystal panel 100 (of FIG. 2) by the ASPSA layer 159 so that undesired charges causing static electricity can be discharged through the second polarizing plate 150. Since the static electricity is promptly eliminated from the liquid crystal panel 100, noises in the various signals of the liquid crystal panel 100 due to interference of the static electricity and deteriorations in displayed images such as rippling and wiggling due to influence of the static electricity on the voltages of the pixel electrode 114 (of FIG. 2) and the common electrode 112 (of FIG. 2) are prevented. The first polarizing plate 140 (of FIG. 2) on the outer surface of the first substrate 110 (of FIG. 2) may have the same structure as the second polarizing plate 120.

Referring again to FIG. 2, a conductive sealant 200 is formed on the outer surface of the second substrate 120 in the non-display region A. The conductive sealant 200 contacts the second polarizing plate 150 and a conductive tape (not shown) to be electrically connected to a supporting means (not shown). Accordingly, the conductive sealant 200 electrically connects the second polarizing plate 150 and the conductive tape, and the undesired charges in the liquid crystal panel 100 are eliminated through the second polarizing plate 150, the conductive sealant 200 and the conductive tape.

Figure 4:
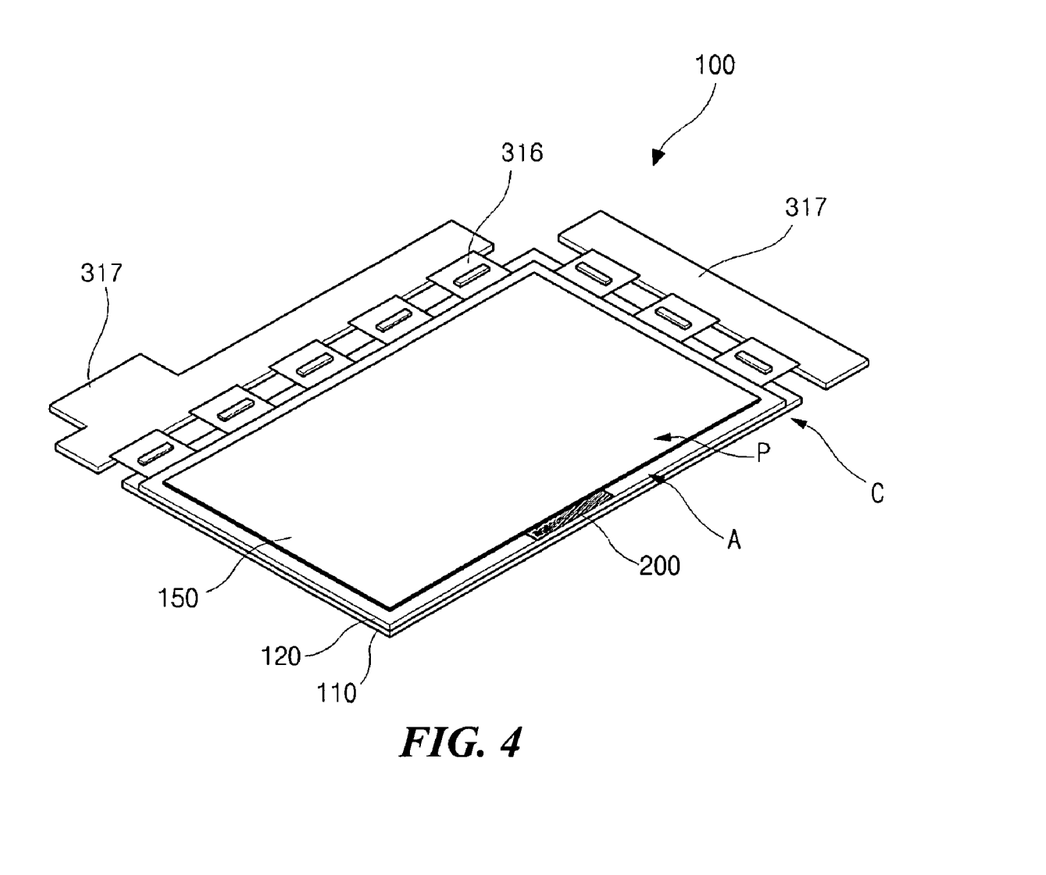
FIG. 4 is a plan view showing an LCD device according to an embodiment of the invention.

FIG. 4 is a plan view showing an LCD device according to an embodiment of the invention.

In FIG. 4, a liquid crystal display device includes a liquid crystal panel 100, a bottom frame 330, a main frame 320 and a top frame (not shown). The bottom frame 330, the main frame 320 and the top frame support and surround the liquid crystal panel such that a second polarizing plate 150 of the liquid crystal panel 100 is exposed through the top frame. Although not shown in FIG. 4, a backlight unit including at least one optic sheet, a light guide plate, at least one lamp and a reflective plate may be disposed between the liquid crystal panel 100 and the bottom frame 330.

The liquid crystal panel 100 have a display region P at a center thereof and a non-display region A surrounding the display region P. The display region P includes a plurality of pixels for displaying images and the second polarizing plate 150 is formed on the outer surface of the liquid crystal panel 100 in the display region P. The non-display region A includes a seal pattern 137 (of FIG. 2) and a black matrix 131 (of FIG. 2). A conductive sealant 200 is formed on a portion of the outer surface of the liquid crystal panel 100 in the non-display region A to correspond to the black matrix 131. The conductive sealant 200 contacts the ASPSA layer 159 (of FIG. 3) of the second polarizing plate 150. The conductive sealant 200 may include a high molecule mixture of epoxy resin and conductive material such as silver (Ag). For example, the sealant may be formed to have a line shape by dispensing the high molecule mixture along a line using a dispensing apparatus including a spraying portion such as syringe nozzle.

In addition, a conductive tape 300 is attached to the conductive sealant 200. The conductive tape 300 is connected to a portion having a ground voltage. For example, the conductive tape 300 may be connected to a supporting means including the top frame, the main frame 320 and the bottom frame 330. Accordingly, the ASPSA layer 159 of the second polarizing plate 150, the conductive sealant 200 and the conductive tape 300 are electrically connected to each other and may be grounded. As a result, undesired charges in the liquid crystal panel 100 are discharged through the ASPSA layer 159 of the second polarizing plate 150, the conductive sealant 200 and the conductive tape 300 and the static electricity is completely eliminated. For example, the conductive sealant 200 may have a width corresponding to a width of the conductive tape 300. Since the conductive sealant 200 and the conductive tape 300 are disposed in the non-display region A, a display size of the LCD device is not reduced.

Figure 5A:
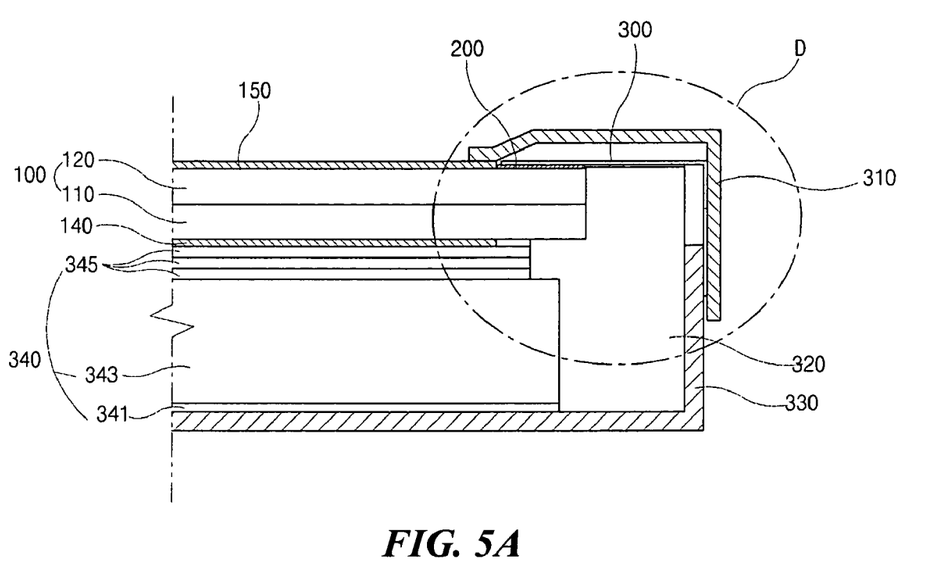
FIG. 5A is a cross-sectional view showing an LCD device according to an embodiment of the invention.
Figure 5B:
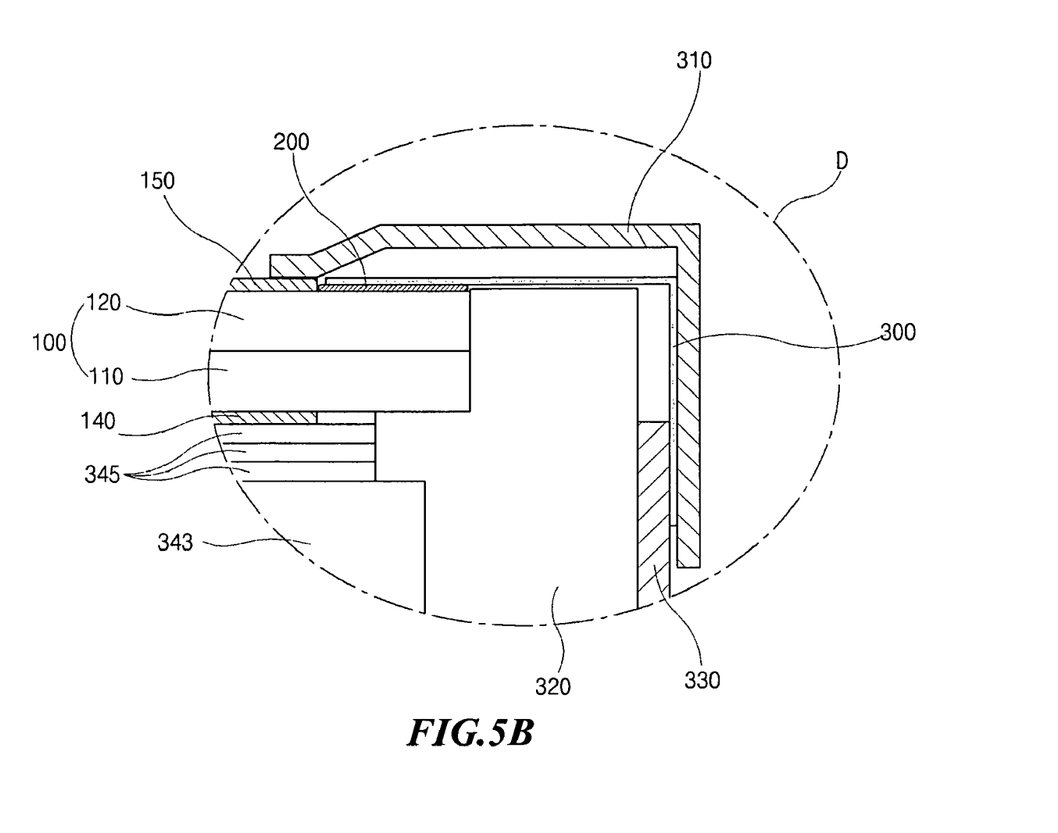
FIG. 5B is a magnified view of a portion D of FIG. 5A.

FIG. 5A is a cross-sectional view showing an LCD device according to an embodiment of the invention, and FIG. 5B is a magnified view of a portion D of FIG. 5A.

In FIGS. 5A and 5B, a liquid crystal display device includes a liquid crystal panel 100, a backlight unit 340, a bottom frame 330, a main frame 320 and a top frame 310. The liquid crystal panel 100 displaying images includes first and second substrates 110 and 120 and a liquid crystal layer 130 (of FIG. 2) between the first and second substrates 110 and 120. First and second polarizing plates 140 and 150 are formed on outer surfaces of the first and second substrates 110 and 120, respectively. The second polarizing plate 150 includes an ASPSA layer 159 (of FIG. 2). Alternatively, each of the first and second polarizing plates 140 and 150 may include an ASPSA layer 159 (of FIG. 2). A printed circuit board (PCB) (not shown) is connected to at least one side of the liquid crystal panel 100 through a connection means such as a flexible printed circuit (FPC). The PCB may be bent to be disposed between the main frame 320 and a side surface of the liquid crystal panel 100 or between the bottom frame 330 and a rear surface of the liquid crystal panel 100 when the liquid crystal panel 100 is coupled with the top, main and bottom frames 310, 320 and 330. The liquid crystal panel 100, the backlight unit 340 and the top, main and bottom frames 310, 320 and 330 surrounding the liquid crystal panel 100 and the backlight unit 340 may be referred to as a liquid crystal display module.

The backlight unit 340 supplying light is disposed under the liquid crystal panel 100. The backlight unit 340 may include at least one lamp (not shown), a reflective plate 341, a light guide plate 343 and at least one optic sheet 345. The at least one lamp may be disposed along a side of the mainframe 320. For example, the at least one lamp may include a cold cathode fluorescent lamp (CCFL) or an external electrode fluorescent lamp (EEFL). The backlight unit 340 may further include a lamp guide supporting the at least one lamp. The lamp guide may have an open portion facing the light guide plate 343 and surround the at least one lamp to protect the at least one lamp and reflect light toward the light guide plate 343. The light guide plate 343 provides a plane light to the liquid crystal panel 100 by using total reflection of light from the at least one lamp. In addition, the light guide plate 343 may include a predetermined pattern to improve uniformity of the plane light. The reflective plate 341 is disposed under the light guide plate 343 to reflect light from a rear surface of the light guide plate 343. The at least one optic sheet 345 may include a diffusing sheet and a collimating sheet such as a prism sheet. The uniformity of the plane light from the light guide plate 343 is improved by the at least one optic sheet 345.

The light from the at least one lamp enters the light guide plate 343 by the lamp guide and is refracted toward the at least one optic sheet 345 in the light guide plate 343. The light from the light guide plate 343 is enhanced in uniformity by the at least one optic sheet 345 and then is supplied to the liquid crystal panel 100. As a result, the liquid crystal panel 100 displays images using the light from the at least one optic sheet 345.

The liquid crystal panel 100 and the backlight unit 340 are coupled with each other by the top, main and bottom frames 310, 320 and 330. The top frame 310 covers front boundary portions of the liquid crystal panel 100. In addition, the bottom frame 330 where the liquid crystal panel 100 and the backlight unit 340 are disposed may have a rectangular plate shape such that edge portions thereof are bent upwardly. The main frame 320 having a rectangular band shape surrounds side portions of the liquid crystal panel 100 and the backlight unit 340. The main frame 320 combined with the top and bottom frames 310 and 330 includes the liquid crystal panel 100 and the backlight unit 340 to constitute the LCD device.

The backlight unit 340 has a side light type where a plurality of lamps are piled along a side of the main frame 320 or a plurality of lamps are disposed along opposite two sides of the main fame 320. In another embodiment, the backlight unit 340 may have a direct light type where a plurality of lamps are disposed over the reflective plate 341. The light guide plate 343 may be omitted in the direct light type backlight unit.

A conductive sealant 200 is formed on an outer surface of the second substrate 120 of the liquid crystal panel 100 and a conductive tape 300 is formed on the conductive sealant 200. The conductive tape 300 may include a conductive material such as aluminum (Al) and may have an extensible shape including wrinkles. Since the conductive sealant 200 contacts the ASPSA layer 159 of the second polarizing plate 150 and the conductive tape 310 contacts the conductive sealant 200, the ASPSA layer 159 of the second polarizing plate 150 is electrically connected to the conductive tape 300. Further, the conductive tape 300 contacts an external portion. For example, the conductive tape 300 may contact at least one of the top and bottom frames 310 and 330 grounded. Accordingly, the ASPSA layer 159 of the second polarizing plate 150 may be grounded and undesired charges of the liquid crystal panel 100 may be discharged through the ASPSA layer 159 of the second polarizing plate 150, the conductive sealant 200, the conductive tape 300 and at least one of the top and bottom frames 310 and 330. Since the static electricity is eliminated from the liquid crystal panel 100, interferences with various signals and influence on voltages of the pixel electrode 114 (of FIG. 2) and the common electrode 112 (of FIG. 2) are prevented. Moreover, since a step of forming a transparent conductive material layer on the outer surface of the second substrate 120 is omitted, production cost of the LCD device is reduced and fabrication process of the LCD device is simplified.

Furthermore, since a transparent conductive material layer is not formed on the outer surface of the second substrate 120, transmittance of the liquid crystal panel 100 increases. TABLE 1 shows transmittance of a liquid crystal panel of an LCD device according to an embodiment of the invention.

In TABLE 1, each of samples 1 to 5 corresponds to a liquid crystal display device according to an embodiment of the invention which includes a liquid crystal panel 100 having a second polarizing plate 150, a conductive sealant 200 and a conductive tape 300, while a sample 6 corresponds to a liquid crystal display device according to the related art which includes a transparent conductive material layer on an outer surface of a second substrate.

TABLE 1

|  | liquid crystal panel of the invention | | | | | liquid crystal panel having transparent conductive material layer sample 6 |
| --- | --- | --- | --- | --- | --- | --- |
|  | resistance of ASPSA layer ($10^{11}\ \Omega$) | | resistance of ASPSA layer ($10^9\ \Omega$) | | | |
|  | sample 1 | sample 2 | sample 3 | sample 4 | sample 5 | (comparison) |
| after backlight unit | 6280 nit | 6243 nit | 6283 nit | 6282 nit | 6298 nit | 6298 |
| after liquid crystal panel | 479 nit | 493 nit | 501.4 nit | 499.3 nit | 506.7 nit | 481.9 |
| transmittance | 4.24% | 4.39% | 4.43% | 4.42% | 4.47% | 4.25% |
| average transmittance |  | 4.31% |  | 4.44% |  | 4.25% |

The intensity of the light from the at least one lamp is attenuated while passing through the backlight unit and the liquid crystal panel. The average transmittance of the LCD devices of samples 1 and 2 is about 4.31% and the average transmittance of the LCD devices of samples 3 to 5 is about 4.44%, while the average transmittance of the LCD device of sample 6 is about 4.25%. Since the LCD devices of samples 1 to 5 do not include the transparent conductive material layer, the average transmittance of the LCD devices of samples 1 to 5 is improved by about 0.06% to about 0.19% as compared with the transmittance of the LCD device of sample 6. Specifically, as the resistance of the ASPSA layer 159 of the second polarizing plate 150 decreases, the transmittance increases.

Figure 6A:
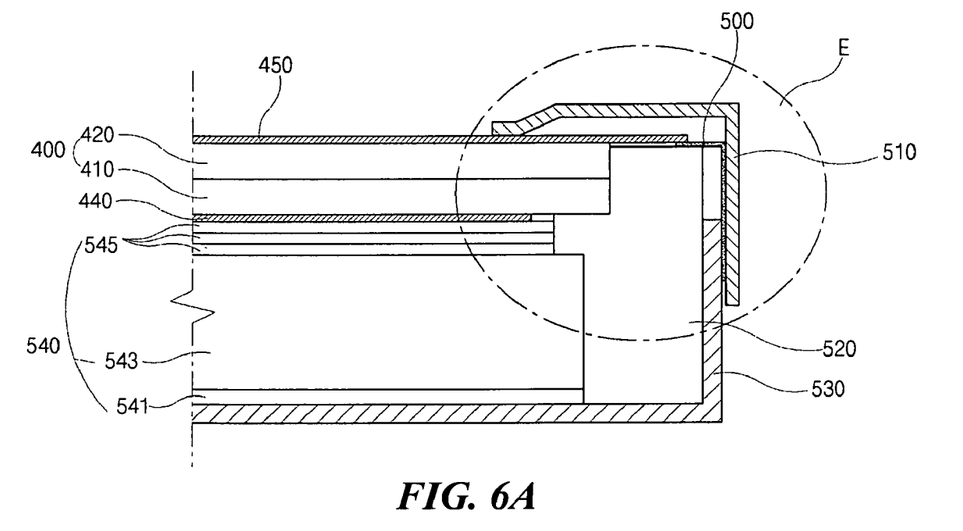
FIG. 6A is a cross-sectional view showing an LCD device according to another embodiment of the invention.
Figure 6B:
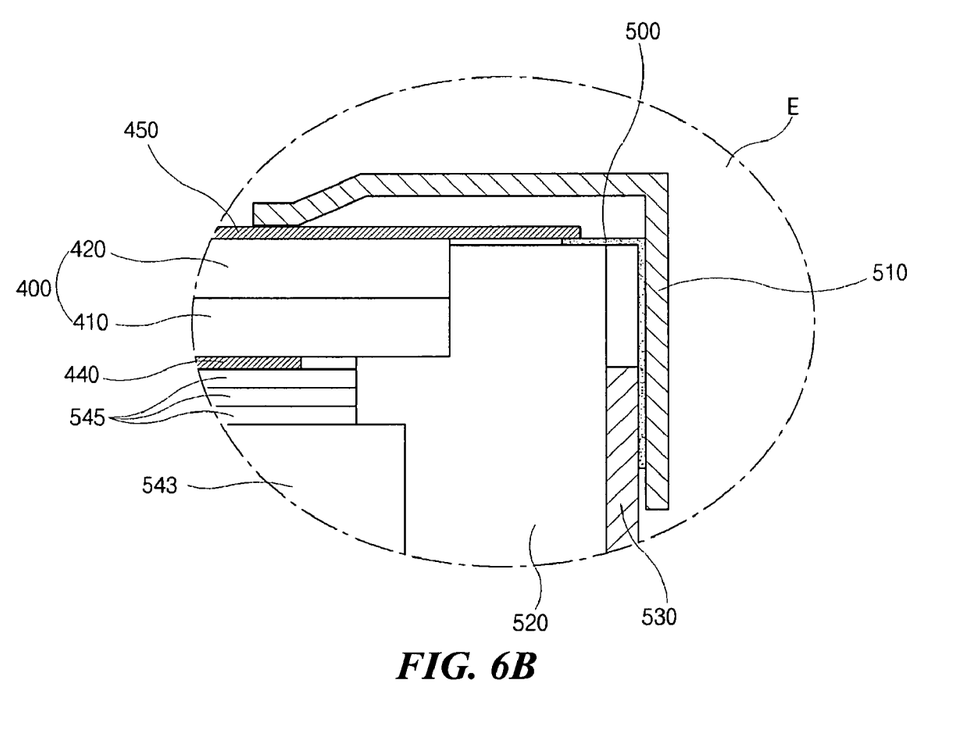
FIG. 6B is a magnified view of a portion E of FIG. 6A.

FIG. 6A is a cross-sectional view showing an LCD device according to another embodiment of the invention, and FIG. 6B is a magnified view of a portion E of FIG. 6A. Since the structure of the LCD device of FIGS. 6A and 6B is similar to the structure of the LCD device of FIGS. 5A and 5B, illustration regarding the identical portions will be omitted.

In FIGS. 6A and 6B, a liquid crystal display device includes a liquid crystal panel 400, a backlight unit 540, a bottom frame 530, a main frame 520 and a top frame 510. The liquid crystal panel 400 displaying images includes first and second substrates 410 and 420 and a liquid crystal layer (not shown) between the first and second substrates 410 and 420. First and second polarizing plates 440 and 450 are formed on outer surfaces of the first and second substrates 410 and 420, respectively. The second polarizing plate 450 includes an ASPSA layer (not shown). Alternatively, each of the first and second polarizing plates 440 and 450 may include an ASPSA layer. The liquid crystal panel 400, the backlight unit 540 and the top, main and bottom frames 510, 520 and 530 surrounding the liquid crystal panel 400 and the backlight unit 540 may be referred to as a liquid crystal display module.

The backlight unit 540 supplying light is disposed under the liquid crystal panel 400. The backlight unit 540 may include at least one lamp (not shown), a reflective plate 541, a light guide plate 543 and at least one optic sheet 545. The at least one lamp may be disposed along a side of the main frame 520.

The liquid crystal panel 400 and the backlight unit 540 are coupled with each other by the top, main and bottom frames 510, 520 and 530. The top frame 510 covers front boundary portions of the liquid crystal panel 400. In addition, the bottom frame 530 where the liquid crystal panel 400 and the backlight unit 540 are disposed may have a rectangular plate shape such that edge portions thereof are bent upwardly. The main frame 520 having a rectangular band shape surrounds side portions of the liquid crystal panel 400 and the backlight unit 540. The main frame 520 combined with the top and bottom frames 510 and 530 includes the liquid crystal panel 400 and the backlight unit 540 to constitute the LCD device.

Since at least one side of the second polarizing plate 450 is extended over a side of the second substrate 420, the second polarizing plate 450 is formed over the main frame 520. In addition, a conductive tape 500 is formed on the main frame 520 under the second polarizing plate 450. As a result, the conductive tape 500 contacts the second polarizing plate 450 and the ASPSA layer of the second polarizing plate 450 is electrically connected to the conductive tape 500. Further, the conductive tape 500 contacts an external portion. For example, the conductive tape 500 may contact the top and bottom frames 510 and 530 grounded. Accordingly, the ASPSA layer of the second polarizing plate 450 may be grounded and undesired charges of the liquid crystal panel 400 may be discharged through the ASPSA layer of the second polarizing plate 450, the conductive tape 500 and at least one of the top and bottom frames 510 and 530. Since the static electricity is eliminated from the liquid crystal panel 400, interferences with various signals and influence on voltages of the pixel electrode (not shown) and the common electrode (not shown) are prevented. Moreover, since a step of forming a transparent conductive material layer on the outer surface of the second substrate 420 is omitted, production cost of the LCD device is reduced and fabrication process of the LCD device is simplified.

In an LCD device according to the invention, undesired charges are discharged through a polarizing plate, a conductive sealant and a conductive tape or through a polarizing plate and a conductive tape. Accordingly, signal noises of the LCD device and deterioration in displayed images are prevented. Further, since a transparent conductive material layer is omitted, production cost is reduced and fabrication process is simplified. Although a polarizing plate having an ASPSA layer is applied to an IPS mode LCD device in the above-mentioned embodiments, the polarizing plate having the ASPSA layer may be applied to a twisted nematic (TN) mode LCD device using a vertical electric field in another embodiment.

It will be apparent to those skilled in the art that various modifications and variations can be made in a liquid crystal display device and a method of fabricating the liquid crystal display device of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device, comprising:
   first and second substrates facing and spaced apart from each other;
   a liquid crystal layer between the first and second substrates;
   a first polarizing plate on an outer surface of the first substrate;
   a second polarizing plate on an outer surface of the second substrate, the second polarizing plate including an anti-static pressure sensitive adhesive layer, wherein the anti-static pressure sensitive adhesive layer is directly on and contacts the outer surface of the second substrate;
   a conductive sealant on the outer surface of the second substrate; and
   a conductive tape electrically connected to the anti-static pressure sensitive adhesive layer, wherein the conductive sealant contacts the anti-static pressure sensitive adhesive layer and the conductive tape.

2. The device according to claim 1, wherein the conductive sealant has a line shape in a non-display region corresponding to a boundary portion of the second substrate.

3. The device according to claim 2, wherein the conductive sealant has a width corresponding to the conductive tape.

4. The device according to claim 1, wherein the conductive sealant includes a mixture of an epoxy resin and a conductive material.

5. A liquid crystal display device, comprising:
   first and second substrates facing and spaced apart from each other;
   a liquid crystal layer between the first and second substrates;
   a first polarizing plate on an outer surface of the first substrate;
   a second polarizing plate on an outer surface of the second substrate, the second polarizing plate including an anti-static pressure sensitive adhesive layer; and
   a conductive tape electrically connected to the anti-static pressure sensitive adhesive layer, and wherein the second polarizing plate is extended over the second substrate and the anti-static pressure sensitive adhesive layer is directly on and contacts the outer surface of the conductive tape.

6. The device according to claim 1, wherein the first substrate includes a gate line, a data line crossing the gate line, a thin film transistor connected to the gate line and the data line, a pixel electrode connected to the thin film transistor and a common electrode spaced apart from the pixel electrode.

7. The device according to claim 1, wherein the second polarizing plate further comprises:
   a first tri-acetate cellulose film on the anti-static pressure sensitive adhesive layer;
   a polarizing layer on the first tri-acetate cellulose film; and
   a second tri-acetate cellulose film on the polarizing layer.

8. The device according to claim 1, wherein the anti-static pressure sensitive adhesive layer includes a metallic epoxy.

9. The device according to claim 1, wherein the conductive tape includes aluminum (Al).

10. The device according to claim 1, further comprising:
    a backlight unit under the second substrate;
    a bottom frame under the backlight unit;
    a main frame surrounding side portions of the first and second substrates and the backlight unit; and
    a top frame surrounding boundary portions of the second substrate,
    wherein the top, main and bottom frames combined with each other to support the first and second substrates and the backlight unit.

11. The device according to claim 10, wherein the conductive tape contacts at least one of the top and bottom frames.

12. A method of fabricating a liquid crystal display device, comprises;
    forming first and second polarizing plates on first and second substrates, respectively, the second polarizing plate including an anti-static pressure sensitive adhesive layer;
    attaching first and second substrates such that the first and second polarizing plates are outwardly disposed, wherein the anti-static pressure sensitive adhesive layer is directly on and contacts the outer surface of the second substrate;
    forming a liquid crystal layer between the first and second substrates;
    forming a conductive sealant on the outer surface of the second, and
    electrically connecting a conductive tape to the anti-static pressure sensitive adhesive layer, and wherein the conductive sealant contacts the anti-static pressure sensitive adhesive layer and the conductive tape.

13. The method according to claim 12, wherein forming the conductive sealant includes dispensing a mixture of an epoxy resin and a conductive material.

14. A method of fabricating a liquid crystal display device, comprises;
    forming first and second polarizing plates on first and second substrates, respectively, the second polarizing plate including an anti-static pressure sensitive adhesive layer;

attaching first and second substrates such that the first and second polarizing plates are outwardly disposed;

forming a liquid crystal layer between the first and second substrates; and electrically connecting a conductive tape to the anti-static pressure sensitive adhesive layer, and wherein the second polarizing plate is extended over the second substrate and the anti-static pressure sensitive adhesive layer is directly on and contacts the outer surface of the conductive tape.

* * * * *